(12) United States Patent
Friend

(10) Patent No.: US 10,974,785 B1
(45) Date of Patent: Apr. 13, 2021

(54) RIDER PROPELLED SCOOTER

(71) Applicant: Kevin Friend, Richmond, VA (US)

(72) Inventor: Kevin Friend, Richmond, VA (US)

( * ) Notice: Subject to any disclaimer, the term of this patent is extended or adjusted under 35 U.S.C. 154(b) by 0 days.

(21) Appl. No.: 16/448,163

(22) Filed: Jun. 21, 2019

(51) Int. Cl.
  *B62M 1/00* (2010.01)
  *B62K 3/00* (2006.01)
  *B62H 1/04* (2006.01)
  *B62L 3/02* (2006.01)
  *B62K 21/02* (2006.01)
  *B62K 21/12* (2006.01)

(52) U.S. Cl.
  CPC .............. *B62K 3/002* (2013.01); *B62H 1/04* (2013.01); *B62K 21/02* (2013.01); *B62K 21/12* (2013.01); *B62L 3/02* (2013.01)

(58) Field of Classification Search
  CPC ...... B62K 3/0002; B62K 21/12; B62K 3/002; B62H 1/04
  See application file for complete search history.

(56) References Cited

U.S. PATENT DOCUMENTS

| | | | |
|---|---|---|---|
| 3,647,241 A * | 3/1972 | Huyssen | B62M 1/00 280/221 |
| 4,941,670 A | 7/1990 | Parr | |
| 5,992,864 A * | 11/1999 | Dickson | B62K 3/002 280/87.041 |
| 7,753,658 B2 * | 7/2010 | Wu | F04B 33/005 417/234 |
| 8,613,457 B2 * | 12/2013 | Wegener | B62K 3/002 280/87.01 |
| 2005/0098973 A1 * | 5/2005 | Pace | B62K 3/002 280/87.041 |
| 2014/0159330 A1 * | 6/2014 | Elliott | B62K 19/14 280/87.041 |
| 2017/0066496 A1 * | 3/2017 | Ochner | B62M 7/12 |
| 2017/0073031 A1 * | 3/2017 | Wright | B62K 19/00 |
| 2017/0073032 A1 * | 3/2017 | Mei | B62J 25/00 |
| 2017/0259878 A1 * | 9/2017 | Rogers | B62J 11/00 |
| 2019/0248439 A1 * | 8/2019 | Wang | B62K 15/006 |

* cited by examiner

*Primary Examiner* — Brian L Swenson
(74) *Attorney, Agent, or Firm* — Sanchelima & Associates, P.A.; Christian Sanchelima; Alexander Rodriguez

(57) ABSTRACT

A scooter to be propelled by a rider is disclosed herein. The scooter comprises a frame including a base capable of supporting the rider standing thereon and having a first side and a second side, and an arcuate bar having a lower end and an upper end. The base has a slot formed at the second side thereof. The arcuate bar extends upwardly from the first side of the base from the lower end thereof. A front wheel is coupled to the upper end of the arcuate bar by a support member, and a rear wheel is coupled to the base at the second side thereof such that the rear wheel is extending into the formed slot thereat. A handlebar is provided at the upper end of the arcuate bar and in connection with the support member to provide directional movement to the front wheel.

19 Claims, 4 Drawing Sheets

RIDER PROPELLED SCOOTER

BACKGROUND OF THE INVENTION

1. Field of the Invention

The present disclosure relates generally to a scooter capable of accommodating a rider standing thereon, and more specifically to a two-wheeled scooter in which the standing rider weights and unweights his/her body mass in order to provide movement thereto.

2. Description of the Related Art

Outdoor sports such as bicycling and skateboarding have recently become very popular. Scooter riding, which is a combination of both skateboarding and bicycling, is another exciting recreational outdoor sport which is becoming popular. Human powered-scooters are known in the art. These scooters are generally two-wheeled vehicles which, unlike bicycles, do not use any complex arrangement of gears and chain mechanism for power; instead these scooters are propelled only by the rider pushing with his/her feet. Human powered scooters are safe and exciting alternatives to stationary bikes or treadmills. However, scooters designed heretofore are generally utilized for the purpose of recreation, and are known to consist basically of familiar, expected and obvious structural configurations, which have been developed for the fulfillment of kids and youngsters.

Previous scooters generally have been designed for non-vigorous recreational activities, such as children's toys and light recreational use by adults. For example, US Patent Publication No. 20020067018 discloses a scooter comprises a deformable footboard, a handlebar frame fastened with the front end of the footboard, a front wheel pivoted to the bottom end of the handlebar frame, a rear wheel pivoted to the rear end of the footboard, and a one-way driving mechanism disposed at a pivoting portion of the rear wheel and the rear end of the footboard to cause the rear wheel to turn unidirectionally at the time when the footboard is caused by an external force to deform.

Some scooter like devices are known which can provide exercise benefits as well. For example, U.S. Pat. No. 4,941,670 discloses a lightweight, easily stored, portable, strong, ride-on-device for transportation and stunt riding. The device is usable on a supporting surface and includes a V-shaped frame on which is mounted an upper and lower body stabilization and support. At least two wheels are rotatably attached to each of two wheel mountings such that in use, the device may be propelled by potential and/or kinetic energy. The direction of travel of the device is governed by the non-perpendicular positioning of the frame relative to the supporting surface. However, such transportation device with small wheels may not be able to support weight of an adult and further may have limited applications.

Therefore, there is a need to provide a ride-on scooter specifically designed for adult recreation and exercise which is capable to support the weight of an adult and is moved with manual force to provide some exercising benefits. Documents describing the closest subject matter provide for a number of more or less complicated features that fail to solve the problems described above in an efficient and economical way. None of the documents suggest the novel features of the present invention.

SUMMARY OF THE INVENTION

While the devices known in the prior-art may fulfill their respective, particular objective and requirements, the aforementioned patents do not describe a scooter specifically designed for adult recreation and exercise which has a contoured frame reinforced at the curved areas to support the weight of an adult and has standard bicycle tires, handlebars, and handbrakes.

It is one of the objectives of the present invention to provide a scooter adapted to be propelled by a user stimulating activity as it forces the body of the user to continuously maintain balance condition.

It is another objective of the present invention to provide a scooter which is able to support weight of an adult rider.

It is yet another objective of the present invention to provide a scooter which is easy and safe to operate by means of utilizing brakes and the like.

It is still another objective of the present invention to provide a scooter which is easy and inexpensive to manufacture.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Figure 1:
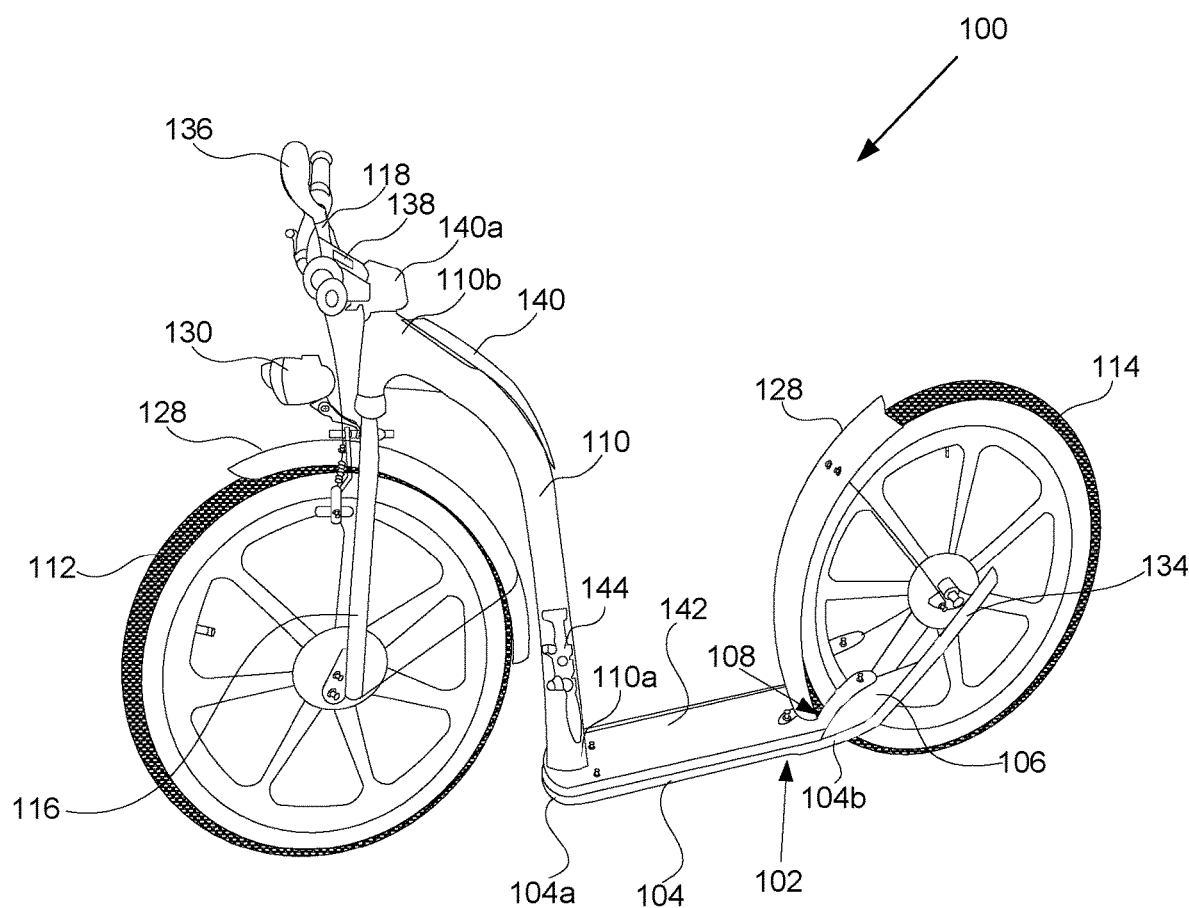
FIG. 1 illustrates a diagrammatic side perspective view of a scooter 100, in accordance with one or more embodiments of the present invention.
Figure 2:
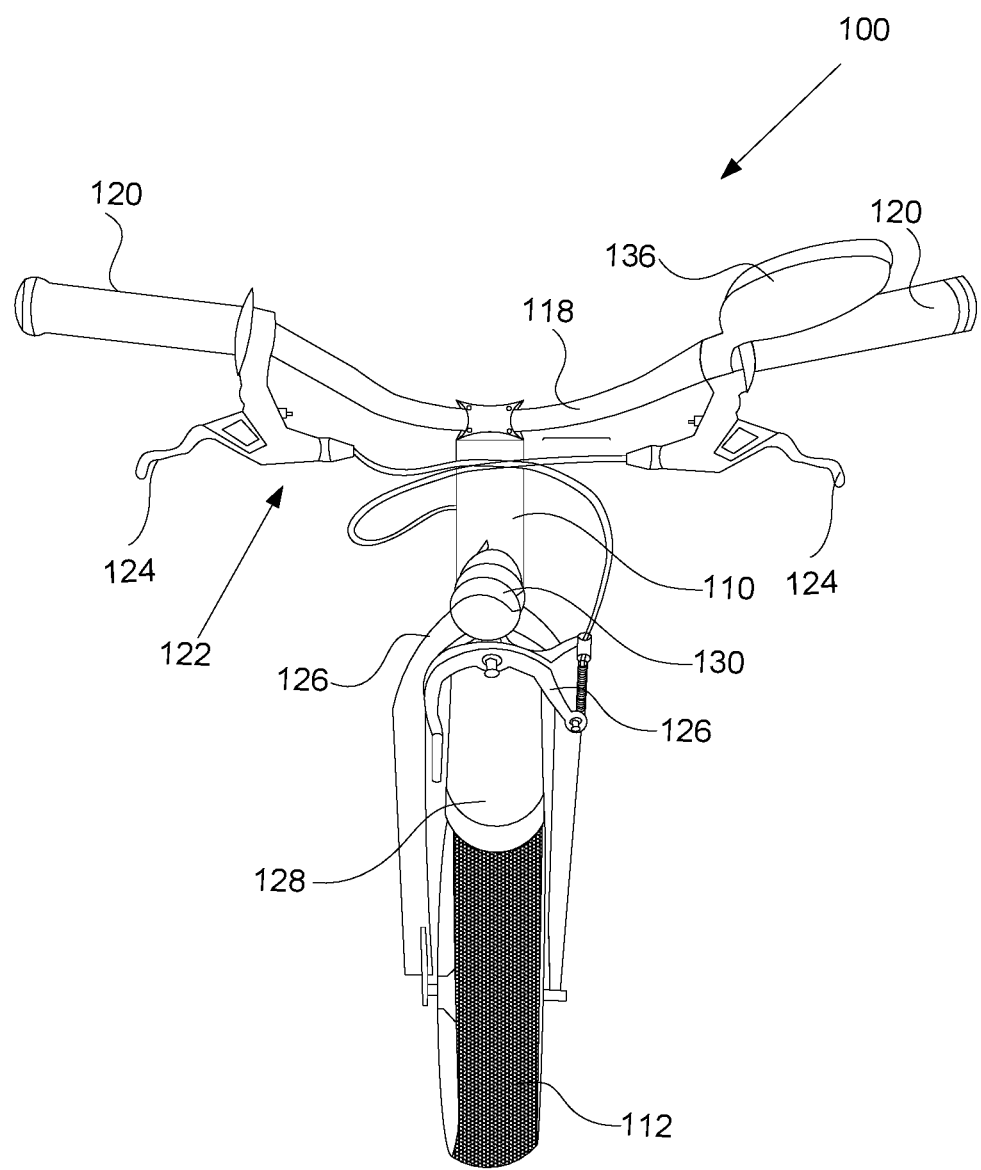
FIG. 2 illustrates a diagrammatic front perspective view of the scooter 100, in accordance with one or more embodiments of the present invention.

Referring to the drawings, FIGS. 1-2 illustrate diagrammatic views of a scooter (generally designated by the numeral 100), in accordance with one or more embodiments of the present disclosure. The scooter 100 is designed and adapted to be propelled by a rider. Herein, the scooter 100 helps with stimulating activity as it forces the body of the rider to provide propelling force, usually in the form of a push against the ground, and continuously maintain balance conditions. The scooter 100 is specifically designed for adult recreation and exercise which has a contoured frame reinforced at the curved areas to support the weight of an adult and has standard bicycle tires, handlebars, and handbrakes.

As illustrated in FIG. 1, the scooter 100 includes a frame 102. The frame 102 includes a base 104 capable of supporting the rider standing thereon. In the present embodiments, the base 104 is a substantially flat structure. The base 104 has a first side 104a and a second side 104b, which are generally a front portion and a rear portion thereof respectively in the illustration of FIG. 1. In an embodiment, the base 104 have an upwardly inclined portion, referred by the numeral 106 in FIG. 1, towards the second side 104b thereof. As illustrated, the base 104 has a slot, generally referred by the numeral 108, formed at the second side 104b thereof. In particular, the inclined portion 106 is in the form of a fork providing the slot 108 in the base 104.

Also, as illustrated, the frame 102 of the scooter 100 includes a bar 110. In the present embodiments, the bar 110 has a generally arcuate shape. Further, the arcuate bar 110 has a substantially inverted L-shaped structure. The bar 110 has a lower end 110a and an upper end 110b. As illustrated, the bar 110 extends upwardly from the base 104, from the lower end 110a thereof. Specifically, the bar 110 extends upwardly from the first side 104a of the base 104. It may be seen that extending upwardly, the bar 110 is curved to provide the substantially inverted L-shaped structure. On bar 110 there may be an air pump 144 removably attached. Air pump 144 may preferably be attached to the lower end 110a of bar 110, however any predetermined location on bar 110 may be suitable. Air pump 144 may be a manual air pump, but other air pumps may be suitable such as an automatic air pump. There may also be a large pad 140 attached to the bar 110, specifically at the upper end 110b of bar 110. Large pad 140 may protect a user or the scooter 100.

Further, as illustrated, the scooter 100 includes two wheels, namely a front wheel 112 and a rear wheel 114. In the present embodiments, as better illustrated in FIG. 2, the scooter 100 also includes a support member 116 which has a substantially inverted U-shaped structure. Herein, the front wheel 112 is coupled to the upper end 110b of the bar 110. Specifically, the front wheel 112 is coupled to the upper end 110b of the bar 110 by the support member 116. It will be appreciated by a person skilled in the art that the support member 116 with the inverted U-shaped or fork structure with its two arms may be coupled to a center of the front wheel 112 at both its sides, by employing a fastening arrangement such as nuts and screws. Similarly, the rear wheel 114 is coupled to the base 104 at the second side 104b thereof. In the present embodiments, the rear wheel 114 is coupled to the base 104 such that it is extending into the formed slot 108 thereat. Specifically, the rear wheel 114 is coupled to the inclined portion 106 of the base 104. Herein, the inclined portion 106 with its two extending members may be coupled to a center of the rear wheel 114 at both its sides, by employing a fastening arrangement such as nuts and screws. It shall be appreciated that the presently utilized wheels, front wheel 112 and rear wheel 114, in the scooter 100 are full-sized regular bicycle wheels as known in the art.

In one or more embodiments, as better illustrated in FIG. 2, the scooter 100 also includes a handlebar 118. The handlebar 118 is provided at the upper end 110b of the arcuate bar 110. The handlebar 118 is in connection with the support member 116 to provide directional movement to the front wheel 112. The handlebar 118 is arranged substantially horizontally with two ends, generally orthogonal to upward extending direction of the bar 110. In some examples, the handlebar 118 is provided with grips 120 at both of the two ends. It may be appreciated that while riding the scooter, the user can turn the handlebar 118 which, in turn, rotates the support member 116 and thereby the front wheel 112, thus allowing the user to change direction of movement, for example, while making a turn of the scooter 100 as desired.

In one or more embodiments, the scooter 100 further includes a brake assembly 122 coupled to the front wheel 112 to provide braking action therefor. As illustrated in FIG. 2, the brake assembly 122 includes a pair of hand brakes 124 with each of the pair of hand brakes 124 provided at one of the two ends of the handlebar 118. One of the hand brakes from the pair of hand brakes 124 may be mechanically or by some other means coupled to a brake caliper 126 associated with the front wheel 112. When the user presses the one of the pair of hand brake s124, the brake caliper 126 is engaged against the front wheel 112 to stop its rotational movement. In some examples, conventional shock absorbers may also be provided in the known manner to provide the scooter 100 with a heavy duty front suspension. In an alternate embodiment, the brake assembly 122 may only include one hand brake. Further, in one or more embodiments, as shown, the front wheel 112 and the rear wheel 114 are provided with wheel guards 128, which are known in the art and have not been described further for the brevity of the present disclosure. It may also be seen from FIG. 1 that the wheel guard 128 provided with the rear wheel 114 is also extending into the formed slot 108 at the second side 104b of the base 104, in the scooter 100.

Figure 3:
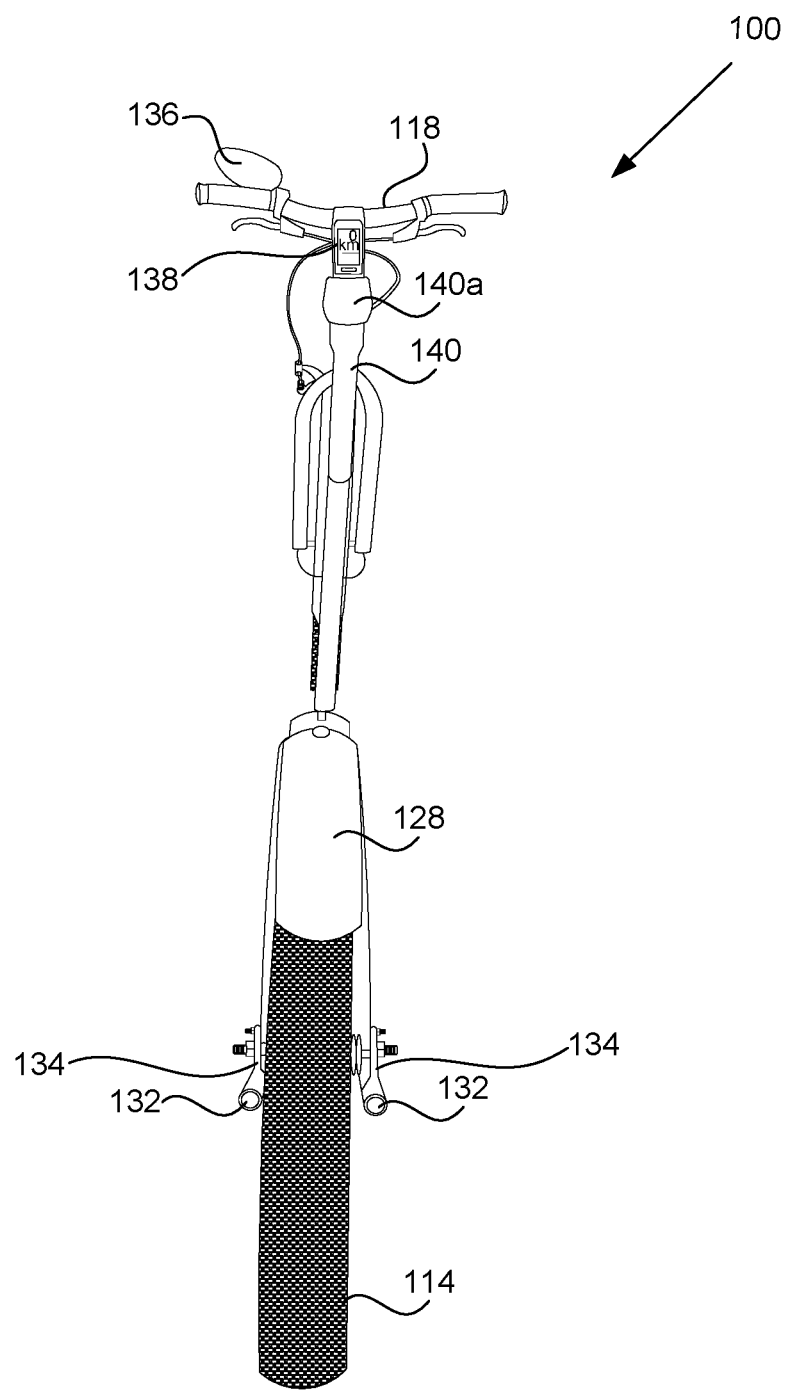
FIG. 3 illustrates a diagrammatic rear perspective view of the scooter 100, in accordance with one or more embodiments of the present invention.

Further, as illustrated in FIG. 1, the scooter 100 may include a front light 130. The front light 130 may be arranged at the upper end 110b of the bar 110. As better illustrated in FIG. 3, the scooter 100 may include a pair of rear lights 132. The rear lights 132 may be arranged in a pair of cylindrical enclosures 134 extending in rearward direction from the inclined portion 106, generally along the same axes. It may be appreciated that the pair of rear lights 132 may be facing rearward of the scooter 100 to act like tail lights therefor. Herein, the front light 130 and the pair of rear lights 132 may be light bulbs of suitable configuration for use with scooters as known in the art. In some examples, the scooter 100 may also include a rear-view mirror 136 as shown in FIGS. 1-3. Further, in some examples, the scooter 100 may also include a digital screen 138 which may be used to display information about operation and condition thereof. For example, the digital screen 138 may be employed to display a current speed, total distance covered, etc. related to the scooter 100. The digital screen 138 may serve as a speedometer to display all necessary information. It may be contemplated by a person skilled in the art that the scooter 100 may incorporate multiple sensors to determine such parameters and in turn be connected to the digital screen 138 for display of information. Sensors that may provide additional information such as heart rate, calories burned or GPS location for example. Such implementation of sensors and display is well known in the art and thus has not been explained herein for the brevity of the present disclosure. Mounted below the digital screen 138 may be a small pad 140a, preferably on the gooseneck portion of the scooter 100. The small pad 140a may be used to protect a user, the digital screen or the covered gooseneck portion of the scooter 100. The large pad 140 and small pad 140a may strategically arranged at positions where a user may generally grip or a part of the body of a user may rest on frame 102 of scooter 100.

Figure 4:
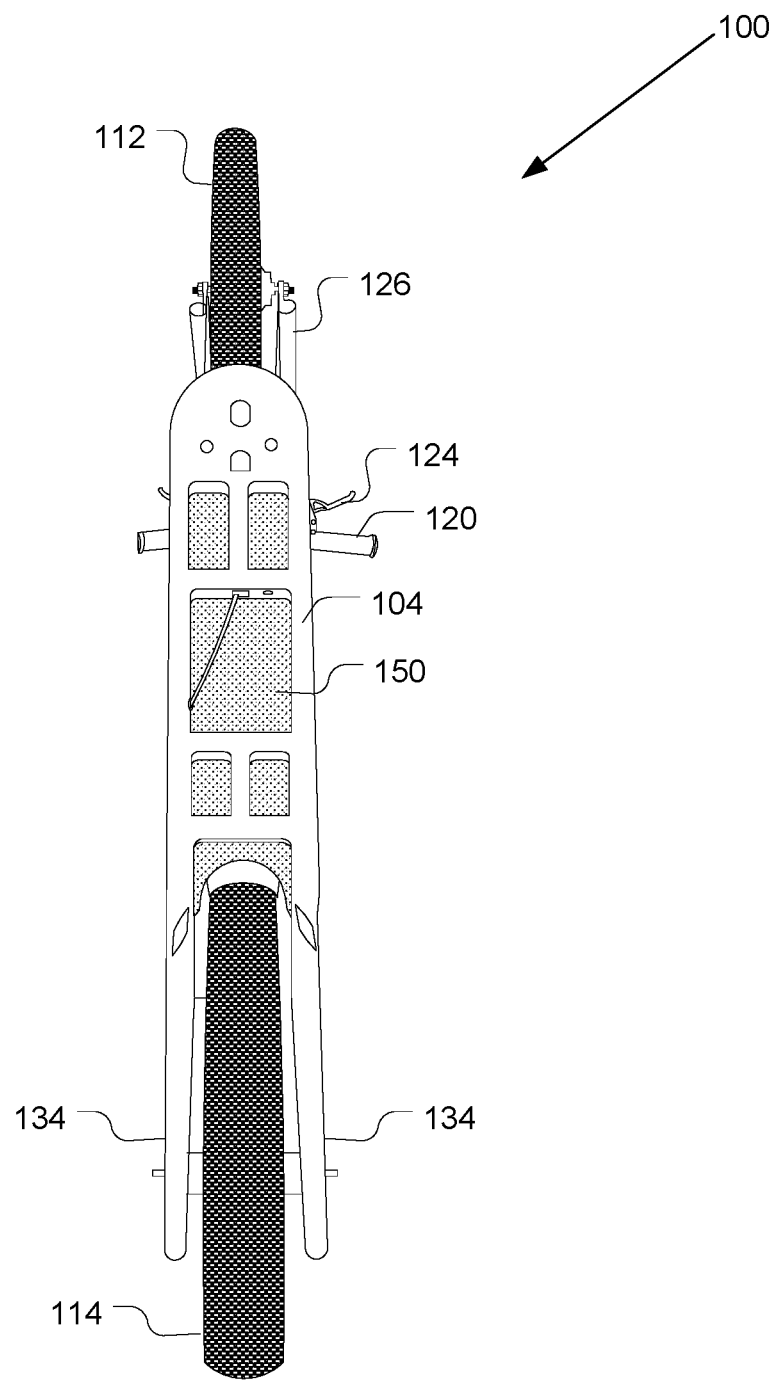
FIG. 4 illustrates a diagrammatic bottom perspective view of scooter 100, in accordance with one or more embodiments of the present invention.

The user rides the scooter 100 instead of pedaling it. Thus, the scooter 100 of the present disclosure provides the rider with cardiovascular exercise. The scooter 100 has a similar design of the frame 102, or specifically the base 104, as that of a skateboard. The base 104 being arranged low provides a low center of gravity for the overall scooter 100 with the rider standing and supported thereon. This makes the device inherently stable. On top of base 104 may be a deck 142 on which a user may be mounted thereon through the use of some attaching means. Deck 142 may preferably be removable from base 104. Deck 142 may preferably be made of bamboo, but other materials may be suitable as well. Other suitable materials may be other types of wood, plastic, or metal, for example. As seen in FIG. 4, underneath of base 104 and deck 142 may be a compartment 150. Compartment 150 may store or house various objects. Preferably, compartment 150 may be used to store items such as first aid kit items or patches to repair a flat that may occur to front wheel 112 or rear wheel 114. The items stored may attach to the lower side of deck 142. The scooter 100 may weigh about 30 pounds and have dimension of about 68 inches by 37 inches, with front wheel 112 and rear wheel 114 of about 20 inches in diameter. In the present embodiments, the frame 102 is made of steel or composite material in order to allow the scooter 100 to support the weight of a grown adult standing thereon.

It shall be noted that devices in the market currently directed towards transportation may be categorized generally as either push-bikes or skateboards. In consideration of these categories with respect to the riders of these devices, push-bikes and skateboards offer distinctly different riding characteristics. Push-bikes on the one hand are maneuvered by the hands and body weight distribution and basically balanced through the gyroscopic effect of the rotating wheels, have a seat for upper body support and means by which the push-bike may be powered. The result is a device particularly suitable for transporting the rider from one place to another. Skateboards on the other hand are maneuvered and balanced by foot manipulation and body weight distribution and are powered by either harnessing the potential energy of a hill or the kinetic energy of the rider. The result in this case is a device offering the rider a means of transportation over short distances. The intention for the design of the scooter 100 is to combine the advantages of each category to produce a new and useful means of transportation offering freedom, portability, upper body support etc., while designed for adult recreation and exercise which has a contoured frame reinforced at the curved areas to support the weight of an adult and has standard bicycle tires, handlebars, and handbrakes.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense in any manner.

What is claimed is:
1. A scooter to be propelled by a rider, comprising:
a) a frame;
b) a base capable of supporting the rider standing thereon and having a first side and a second side, the base having a slot formed at the second side thereof;
c) an arcuate bar having a lower end and an upper end, the arcuate bar extending upwardly from the first side of the base from the lower end thereof, wherein said base is a substantially flat structure with an upward inclined portion towards the second side;
d) a front wheel coupled to the upper end of the arcuate bar by a support member;
e) a rear wheel coupled to the base at the second side thereof such that the rear wheel is extending into the formed slot thereat, said rear wheel extending within said slot of said base, wherein said rear wheel is coupled to said upward inclined portion of said base, said upward inclined portion having two upward extending members coupled to a center of both sides of said rear wheel, a pair of rear lights arranged in cylinder enclosures within said two upward extending members extending in a rearward direction from said upward inclined portion of said base on the same axis; and
f) a handlebar provided at the upper end of the arcuate bar and in connection with the support member to provide directional movement to the front wheel.

2. The scooter unit of claim 1, wherein the front wheel and the rear wheel are provided with wheel guards.

3. The scooter unit of claim 2, wherein the wheel guard provided with the rear wheel is also extending into the formed slot at the second side of the base.

4. The scooter unit of claim 1, wherein the handlebar is arranged substantially horizontally with two ends, and wherein the handlebar is provided with grips at both of the two ends.

5. The scooter of claim 1 further comprising at least one brake assembly coupled to the front wheel to provide braking action therefor.

6. The scooter of claim 1, wherein the arcuate bar has a substantially inverted L-shaped structure.

7. The scooter of claim 1, wherein the support member has a substantially inverted U-shaped structure.

8. The scooter of claim 1, wherein the frame is made of composite material.

9. The scooter of claim 1, wherein said scooter has a digital screen which displays information of a moving speed of said scooter and a distance traveled on said scooter.

10. The scooter of claim 9, wherein said digital screen is connected with a plurality of sensors located on said scooter.

11. The scooter of claim 10, wherein said plurality of sensors are a heart rate sensor and a GPS location sensor.

12. The scooter of claim 1, wherein said scooter includes a deck mounted to the base and said deck is removable.

13. The scooter of claim 12, wherein said scooter includes a compartment underneath said deck.

14. The scooter of claim 12, wherein said deck is made of a bamboo material.

15. The scooter of claim 1, wherein said scooter includes an air pump mounted to the arcuate bar.

16. The scooter of claim 1, wherein said scooter includes a large pad and a small pad mounted to the arcuate bar of said scooter.

17. The scooter of claim 16, wherein said small pad is mounted to a gooseneck portion of said scooter.

18. The scooter of claim 1 further including a front light hingedly mounted to said upper end of said arcuate bar.

19. A system for a scooter, consisting of:
a) a frame including a base configured to support a rider thereon, wherein said base has a flat structure and includes a first side and a second side, wherein said base includes an upward inclined portion on said second side, said upward inclined portion provided in the form of a fork having a slot extending within said base; said frame further including an arcuate bar having an inverted L-shaped structure, said arcuate bar having an upper end and a lower end, said arcuate bar extending upwardly from said first side of said base into a curved configuration, an air pump located on said lower end of said arcuate bar, wherein said air pump is an automatic air pump, said upper end having a large pad mounted thereon configured to provide protection to said rider;

b) a support member having an inverted U-shaped structure, said support member being coupled to said upper end of said arcuate bar, a front wheel and a second wheel, said front wheel coupled to said support member at a center of both sides of said front wheel, said rear wheel coupled to said second side of said base, said rear wheel extending within said slot of said base, wherein said rear wheel is coupled to said upward inclined portion of said base, said upward inclined portion having two upward extending members coupled to a center of both sides of said rear wheel;

c) a handlebar provided at said upper end of said arcuate bar, said handlebar being in connection with said support member providing direction movement to said front wheel, wherein said handlebar being provided with grips on two ends;

d) a brake assembly coupled to said front wheel, said brake assembly including a pair of hand brakes provided for said two ends of said handlebar, said handbrakes coupled to a brake caliper mounted to said front wheel;

e) a first wheel guard mounted to said front wheel, said first wheel guard located between said first wheel and said support member, a second wheel guard mounted to said rear wheel, wherein said second wheel guard extending into said slot of said base;

f) a front light located at said upper end of said arcuate bar, a pair of rear lights arranged in cylinder enclosures extending in a rearward direction from said upward inclined portion of said base, said pair of rear lights being located on the same axis, wherein said front light and said pair of rear lights are light bulbs, a rear view mirror located on one of said two ends of said handlebar;

g) at least one sensor in communication with a digital screen located on a center portion of said handlebar, said digital screen configured to display information gathered from said at least one sensor, a small pad mounted below said digital screen configured to provide protection to a user; and h) a removable deck mounted to a top end of said base configured to have a user mounted thereon, wherein said base includes a bottom end having a compartment mounted thereon configured to store various items.

* * * * *